US012730954B2

(12) United States Patent
Barker

(10) Patent No.: US 12,730,954 B2
(45) Date of Patent: Sep. 8, 2026

(54) STATISTICAL TIMING CHARACTERIZATION OF SUPERCONDUCTING ELECTRONIC CIRCUIT DESIGNS

(71) Applicant: Synopsys, Inc., Mountain View, CA (US)

(72) Inventor: Aaron John Barker, Broomfield, CO (US)

(73) Assignee: Synopsys, Inc., Sunnyvale, CA (US)

(*) Notice: Subject to any disclaimer, the term of this patent is extended or adjusted under 35 U.S.C. 154(b) by 638 days.

(21) Appl. No.: 18/110,932

(22) Filed: Feb. 17, 2023

(65) Prior Publication Data

US 2024/0281582 A1 Aug. 22, 2024

(51) Int. Cl.

*G06F 30/33* (2020.01)
*G06F 30/3315* (2020.01)
*G06F 111/20* (2020.01)

(52) U.S. Cl.

CPC ...... *G06F 30/3315* (2020.01); *G06F 2111/20* (2020.01)

(58) Field of Classification Search

USPC ........................................ 716/104, 106, 108
See application file for complete search history.

(56) References Cited

U.S. PATENT DOCUMENTS

2012/0284680 A1 11/2012 Iyer et al.
2022/0171910 A1 6/2022 Shen et al.

FOREIGN PATENT DOCUMENTS

CN 106124046 A * 11/2016 ................ G01J 1/42

OTHER PUBLICATIONS

Katam Naveen Kumar et al: "Timing Characterization for Static Timing Analysis of Single Flux Quantum Circuits", vol. 29, No. 6, Sep. 1, 2019.*

International Application No. PCT/US2024/013576, International Search Report and Written Opinion, Dated Apr. 28, 2025.

(Continued)

*Primary Examiner* — Brian Ngo
(74) *Attorney, Agent, or Firm* — Patterson + Sheridan, LLP

(57) ABSTRACT

The present disclosure describes systems and methods for generating timing libraries. The apparatus includes a memory and a processor. The processor determines a condition that indicates whether a superconducting electronic circuit design passes or fails logic verification and determines an edge-of-failure value for a timing parameter for the superconducting electronic circuit design. The processor simulates the superconducting electronic circuit design using the edge-of-failure value for the timing parameter and a first process variation to produce a first timing value for the superconducting electronic circuit design and simulates the superconducting electronic circuit design using the edge-of-failure value for the timing parameter and a second process variation to produce a second timing value for the superconducting electronic circuit design. The processor generates a timing library for the superconducting electronic circuit design based at least in part on the first timing value and the second timing value.

20 Claims, 8 Drawing Sheets

(56) References Cited

OTHER PUBLICATIONS

Katam Naveen Kumar et al: "Timing Characterization for Static Timing Analysis of Single Flux Quantum Circuits", IEEE Transactions On Applied Superconductivity, IEEE, USA, vol. 29, No. 6, Sep. 1, 2019 {Sep. 1, 2019), pp. 1-8, XP011707298, ISSN: 1051-8223, DOI: 10.1109/TASC.2019.2891166 [retrieved on Jan. 28, 2019] Sec. I., II. B; III. A, B, C; IV. A. abstract.
Amparo Denis et al: "Timing Characterization for RSFQ Cell Library", IEEE Transactions On Applied Superconductivity, IEEE, USA, vol. 29, No. 5, Aug. 1, 2019 (Aug. 1, 2019) , pp. 1-9, XP011712290, ISSN: 1051-8223, DOI: 10.1109/TASC.2019.2897317 [retrieved on Feb. 25, 2019] Sec. III; abstract.
International Application No. PCT/US2024/013576, Preliminary Report On Patentability, Dated Aug. 28, 2025.
PSCAN2. Pavel Shevchenko. Available: http://pscan2sim.org/.
S. Polonsky et al., "PSCAN'96: New software for simulation and optimization of complex RSFQ circuits," IEEE Trans. Appl. Supercond., vol. 7, No. 2, pp. 2685-2689, Jun. 1997.
A. Inamdar et al., "Development of Superconductor Advanced Integrated Circuit Design Flow Using Synopsys Tools," in IEEE Transactions on Applied Superconductivity, vol. 31, No. 5, pp. 1-7, Aug. 2021, Art No. 1301907, doi: 10.1109/TASC.2021.3058088.
S. C. Lo, et al., "High Sigma Statistical Hold Time Analysis in FinFET Sequential Circuits," 2017 18th International Symposium on Quality Electronic Design (ISQED), 2017, pp. 215-220, doi: 10.1109/ISQED.2017.7918319.
EP Office Action, Application No. 24861375.4 dated Jun. 15, 2026.

* cited by examiner

STATISTICAL TIMING CHARACTERIZATION OF SUPERCONDUCTING ELECTRONIC CIRCUIT DESIGNS

GOVERNMENT LICENSE RIGHTS

This invention was made with United States (U.S.) government support under Contract No. W911NF-17-9-0001 awarded by the Office of the Director of National Intelligence, Intelligence Advanced Research Projects Activity (IARPA), via the U.S. Army Research Office. The U.S. government has certain rights in the invention.

TECHNICAL FIELD

The present disclosure relates to an electronic design automation (EDA) system. In particular, the present disclosure relates to statistical timing characterization of superconducting electronic circuit designs.

BACKGROUND

Superconducting electronic components or circuits may conduct electricity with zero resistance and expel magnetic flux (Meisner effect) when cooled below a critical temperature (Tc). For example, Tc for Niobium may be around 9.7 Kelvin (K), and circuits that include Niobium may have a nominal operating temperature of 4.2K, which may be achieved through submersion into liquid helium. Timing characterization may be performed using timing data for digital logic circuits in timing libraries. These timing libraries, however, may not exist and may not be easily generated for superconducting electronic components or circuits.

SUMMARY

The present disclosure describes systems and methods for generating timing libraries. According to an embodiment, an apparatus for generating a timing library for a superconducting electronic circuit design includes a memory and a processor communicatively coupled to the memory. The processor determines a condition that indicates whether a superconducting electronic circuit design passes or fails logic verification and determines, according to the condition, an edge-of-failure value for a timing parameter for the superconducting electronic circuit design. The processor simulates the superconducting electronic circuit design using the edge-of-failure value for the timing parameter and a first process variation to produce a first timing value for the superconducting electronic circuit design and simulates the superconducting electronic circuit design using the edge-of-failure value for the timing parameter and a second process variation to produce a second timing value for the superconducting electronic circuit design. The processor generates a timing library for the superconducting electronic circuit design based at least in part on the first timing value and the second timing value.

The processor may perform static timing analysis for the superconducting electronic circuit design using the timing library.

The timing parameter may be a signal arrival time in the superconducting electronic circuit design or a timing separation between a race condition in the superconducting electronic circuit design.

Determining the edge-of-failure value may include determining, for different values of the timing parameter, whether the superconducting electronic circuit design meets the condition.

Simulating the superconducting electronic circuit design to produce the first timing value and the second timing value may be part of a Monte Carlo simulation of the superconducting electronic circuit design.

The processor may set a range for the timing parameter. Determining the edge-of-failure value for the timing parameter may include sweeping within the range.

The processor may add a margin to the first timing value and the second timing value.

According to another embodiment, a method for generating a timing library for a superconducting electronic circuit design includes determining a condition that indicates whether a superconducting electronic circuit design passes or fails logic verification and determining, according to the condition and by a processor, an edge-of-failure value for a timing parameter for the superconducting electronic circuit design. The method also includes simulating, by the processor, the superconducting electronic circuit design using the edge-of-failure value for the timing parameter and a first process variation to produce a first timing value for the superconducting electronic circuit design and simulating, by the processor, the superconducting electronic circuit design using the edge-of-failure value for the timing parameter and a second process variation to produce a second timing value for the superconducting electronic circuit design. The method further includes generating a timing library for the superconducting electronic circuit design based at least in part on the first timing value and the second timing value.

The method may include performing static timing analysis for the superconducting electronic circuit design using the timing library.

The timing parameter may be a signal arrival time in the superconducting electronic circuit design or a timing separation between a race condition in the superconducting electronic circuit design.

Determining the edge-of-failure value may include determining, for different values of the timing parameter, whether the superconducting electronic circuit design meets the condition.

Simulating the superconducting electronic circuit design to produce the first timing value and the second timing value may be part of a Monte Carlo simulation of the superconducting electronic circuit design.

The method may include setting a range for the timing parameter. Determining the edge-of-failure value for the timing parameter may include sweeping within the range.

The method may include adding a margin to the first timing value and the second timing value.

According to another embodiment, a non-transitory computer readable medium stores instructions for generating a timing library for a superconducting electronic circuit design. When the instructions are executed by a processor, the processor determines an a value for a timing parameter for a superconducting electronic circuit design and simulates the superconducting electronic circuit design using the value for the timing parameter and a plurality of process variations to produce a plurality of timing values for the superconducting electronic circuit design. The processor also generates a timing library for the superconducting electronic circuit design based on the plurality of timing values.

The processor may perform static timing analysis for the superconducting electronic circuit design using the timing library.

The timing parameter may be a signal arrival time in the superconducting electronic circuit design or a timing separation between a race condition in the superconducting electronic circuit design.

Determining the value may include determining, for different values of the timing parameter, whether the superconducting electronic circuit design meets a condition that indicates whether the superconducting electronic circuit design passes or fails logic verification.

Simulating the superconducting electronic circuit design to produce the plurality of timing values may be part of a Monte Carlo simulation of the superconducting electronic circuit design.

The processor may set a range for the timing parameter. Determining the value for the timing parameter may include sweeping within the range.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to statistical timing characterization of superconducting electronic circuit designs. Timing characterization may be performed using timing data in timing libraries. The timing characterization may allow circuit designers to understand whether an electronic circuit design will satisfy or violate timing requirements. For example, the timing libraries may indicate the delays introduced by various circuit components. These delays may be used to determine an overall delay introduced by different components in a circuit design. Timing libraries for superconducting electronic components or circuits, however, may not exist and may be challenging to generate.

The present disclosure describes a system that generates timing libraries for superconducting electronic components or circuits. Generally, the system determines whether a superconducting electronic component or circuit will pass or fail logic verification while varying a timing parameter (e.g., arrival time of a signal or timing separation between a race condition). Through this process, the system uses an optimizer to determine an edge-of-failure value for the timing parameter, where a slight increase or decrease to the edge-of-failure value causes the superconducting electronic component or circuit to fail logic verification. The system then simulates the superconducting electronic component or circuit using the edge-of-failure value and various process variations to produce timing values for the superconducting electronic component or circuit. The system may then generate a timing library using the timing values.

In certain embodiments, the system provides several technical advantages. For example, the system allows timing analysis (e.g., static timing analysis) to be performed on the superconducting electronic component or circuit. Additionally, the system may probabilistically add margin when generating the timing libraries, which may margin against failure and improve the performance or yield of the superconducting electronic component or circuit.

Figure 1A:
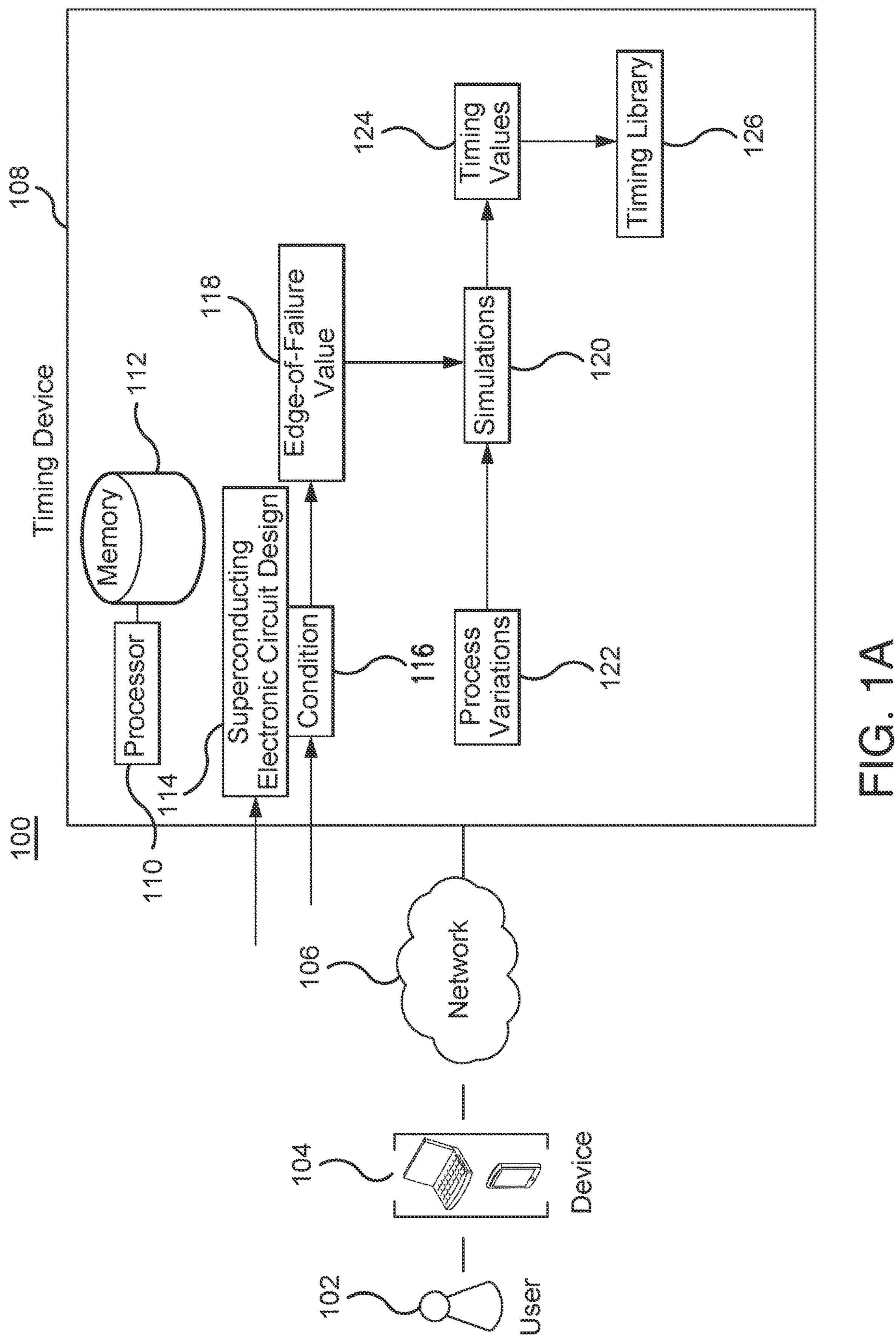
FIG. 1A illustrates an example system for generating timing libraries for superconducting electronic circuit designs.

FIG. 1A illustrates an example system 100. As seen in FIG. 1A, the system 100 includes one or more devices 104, a network 106, and a timing device 108. Generally, the system 100 may be used to generate timing libraries for superconducting electronic circuit designs. These timing libraries may then be used to perform timing analysis (e.g., static timing analysis) for the superconducting electronic circuit designs or their components.

The user 102 may use the device 104 to interact with or control other components of the system 100. For example, the user 102 may use the device 104 to instruct the timing device 108 to generate timing libraries for a superconducting electronic circuit design. Additionally, the user 102 may use the device 104 to provide the superconducting electronic circuit design to the timing device 108. The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The network 106 is any suitable network operable to facilitate communication between the components of the system 100.

Figure 7:
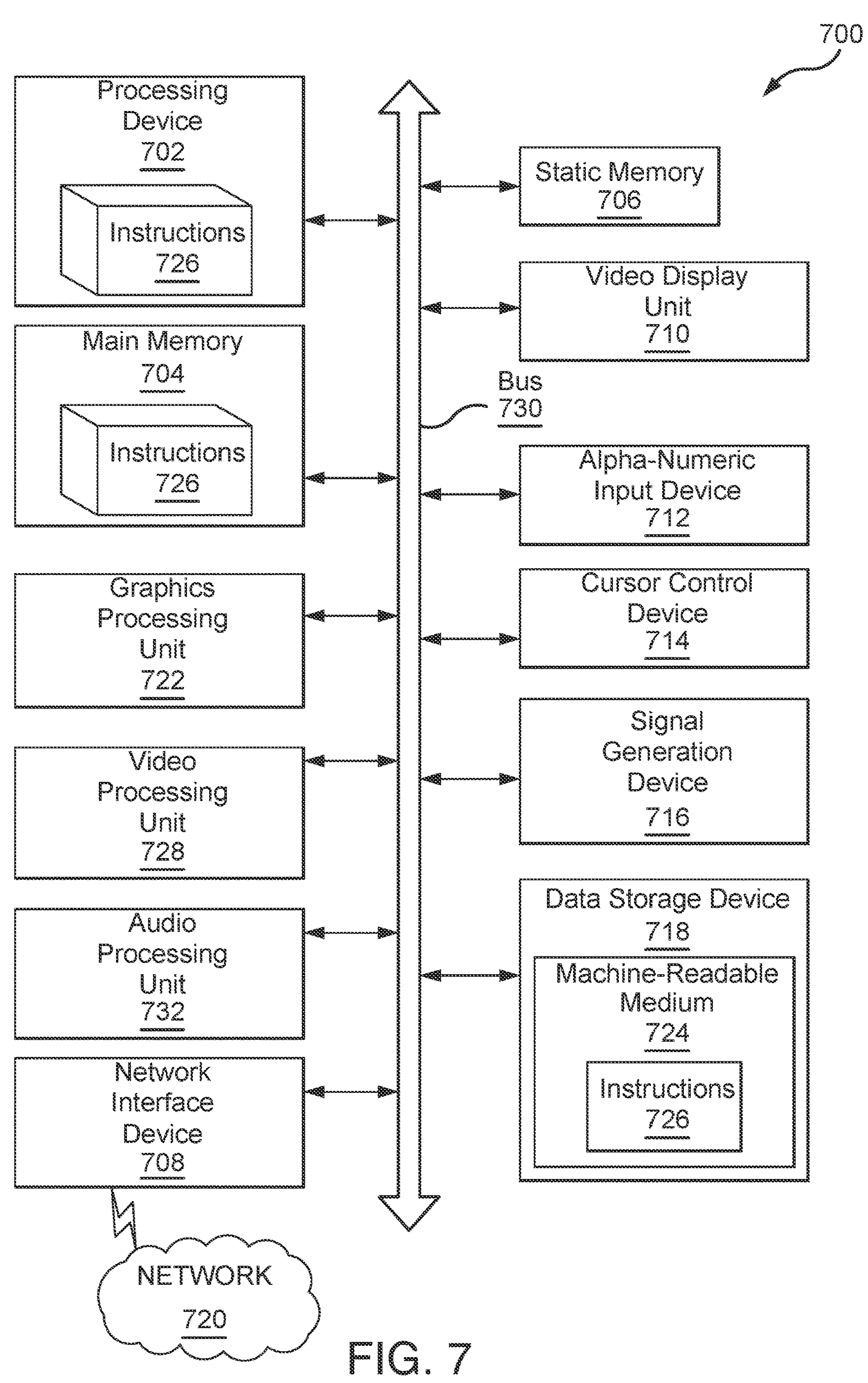
FIG. 7 depicts a diagram of an example computer system in which embodiments of the present disclosure may operate.

The timing device 108 may be a computer system (e.g., the computer system 700 shown in FIG. 7). The timing device 108 generates timing libraries for superconducting electronic circuit designs. Generally, the timing device 108 simulates a superconducting electronic circuit design using different values for timing parameters to determine an edge-of-failure value for the timing parameter. The timing device 108 may then simulate the superconducting electronic circuit design using the edge-of-failure value and different process variations to produce timing values for the superconducting electronic circuit design. The timing device 108 may then generate timing libraries using the timing values. As seen in FIG. 1A, the timing device 108 includes a processor 110 and a memory 112, which may perform the actions or functions of the timing device 108 described herein. The processor 110 and the memory 112 may be the processing device 702 and the memory 704 of the computer system 700 shown in FIG. 7.

The timing device 108 receives a superconducting electronic circuit design 114 from the device 104. The superconducting electronic circuit design 114 may include a superconducting electronic circuit or superconducting electronic circuit components. The superconducting electronic circuit or the superconducting electronic circuit components may include a superconducting material (e.g., Niobium) that conducts electricity with zero resistance. These circuits or circuit components may be used in quantum devices or quantum computers. For example, the superconducting electronic circuit design 114 may include Josephson junctions, adiabatic quantum flux parametron (AQFP) logic, rapid single flux quantum (RSFQ) logic, energy-efficient rapid single flux quantum (ERSFQ) logic, or reciprocal quantum logic (RQL). Generally, the timing device 108 may analyze the superconducting electronic circuit design 114 to generate timing libraries for the superconducting electronic circuit design 114.

The timing device 108 may receive or establish a condition 116 for the superconducting electronic circuit design 114. The condition 116 may be used to determine whether the superconducting electronic circuit design 114 passes or fails logic verification. For example, if the timing device 108 determines that the superconducting electronic circuit design 114 meets the condition 116, then the timing device 108 may determine that the superconducting electronic circuit design 114 passes logic verification. On the other hand, if the timing device 108 determines that the superconducting electronic circuit design 114 does not meet the condition 116, then the timing device 108 may determine that the superconducting electronic circuit design 114 fails logic verification.

In some embodiments, the condition 116 may specify a set of inputs and a set of expected outputs or a set of intermediate signal values. During logic verification, the set of inputs may be provided to the superconducting electronic circuit design 114, and the outputs or the intermediate signal values of the superconducting electronic circuit design 114 may be compared to the expected outputs or the expected intermediate signal values in the conditions 116. If the outputs or intermediate signal values match the expected outputs or the expected intermediate signal values, then the superconducting electronic circuit design 114 may pass logic verification. If the outputs or intermediate signal values do not match the expected outputs or expected intermediate signal values, then the superconducting electronic circuit design 114 may fail logic verification.

The timing device 108 may perform logic verification for the superconducting electronic circuit design 114 using different values for a timing parameter. For example, the timing device 108 may vary the value of the timing parameter while providing a set of inputs to the superconducting electronic circuit design 114. The timing device 108 may then determine whether the superconducting electronic circuit design 114 passes or fails logic verification under different values for the timing parameter.

The timing parameter may be any suitable parameter affecting the timing within the superconducting electronic circuit design 114. For example, the timing parameter may be the arrival time of a signal in the superconducting electronic circuit design 114 or a timing separation between two signals in the superconducting electronic circuit design 114. The timing device 108 may vary the value of the timing parameter as the timing device 108 simulates the superconducting electronic circuit design 114 to determine which values of the timing parameter cause the superconducting electronic circuit design 114 to pass or fail logic verification.

The timing device 108 may track the values of the timing parameter and whether the superconducting electronic circuit design 114 passes or fails logic verification using those values. The timing device 108 may analyze these results to determine an edge-of-failure value 118 for the timing parameter. Generally, the edge-of-failure value 118 is a value of the timing parameter near or on the border between the superconducting electronic circuit design 114 passing or failing logic verification. For example, a small or slight adjustment to the edge-of-failure value 118 may cause the superconducting electronic circuit design 114 to fail logic verification. As a result, the edge-of-failure value 118 for the timing parameter represents a value for the timing parameter for which the superconducting electronic circuit design 114 is close to failing logic verification. In certain embodiments, the timing device 108 may determine multiple edge-of-failure values 118 for the timing parameter.

After the timing device 108 determines the edge-of-failure value 118 for the timing parameter, the timing device 108 may simulate the superconducting electronic circuit design 114 using the edge-of-failure value 118 and different process variations. In the example of FIG. 1A, the timing device 108 begins simulations 120 of the superconducting electronic circuit design 114 using the edge-of-failure value 118 for the timing parameter and different process variations 122. Generally, the process variations 122 may be changes or variations to the processes used to create or produce the superconducting electronic circuit design 114. For example, the process variations 122 may change the thicknesses of layers in the manufacturing and processing steps of superconducting electronic circuit design 114 fabrication. In some embodiments, the variations 122 may include changes or variations in bias or temperature conditions.

The timing device 108 may perform the simulations 120 as Monte Carlo simulations with variations on the processes or conditions used to generate or produce the superconducting electronic circuit design 114. Stated differently, the simulations 120 may be process aware Monte Carlo simulations of the superconducting electronic circuit design 114 along the one or more edge-of-failure values 118 for the timing parameter. The process variations 122 may be generated for different runs of the Monte Carlo simulation.

The timing device 108 may produce timing values 124 through the simulations 120. For example, the timing device 108 may measure the timing values 124 in the superconducting electronic circuit design 114 during each simulation 120 of the superconducting electronic circuit design 114. The timing values 124 may measure any suitable timing characteristic of the superconducting electronic circuit design 114. For example, the timing values 124 may indicate delays, slew rates, and single flux quantum (SFQ)-pulse amplitude and pulse width in the superconducting electronic circuit design 114 under the edge-of-failure value 118 for the timing parameter and the different process variations 122. As a result, the simulations 120 may indicate the effects of the different process variations 122 on the delays and slew rates in the superconducting electronic circuit design 114 at the edge-of-failure value 118 for the timing parameter. The result may be a distribution of delays where every sample is passing at the edge-of-failure.

Figure 1B:
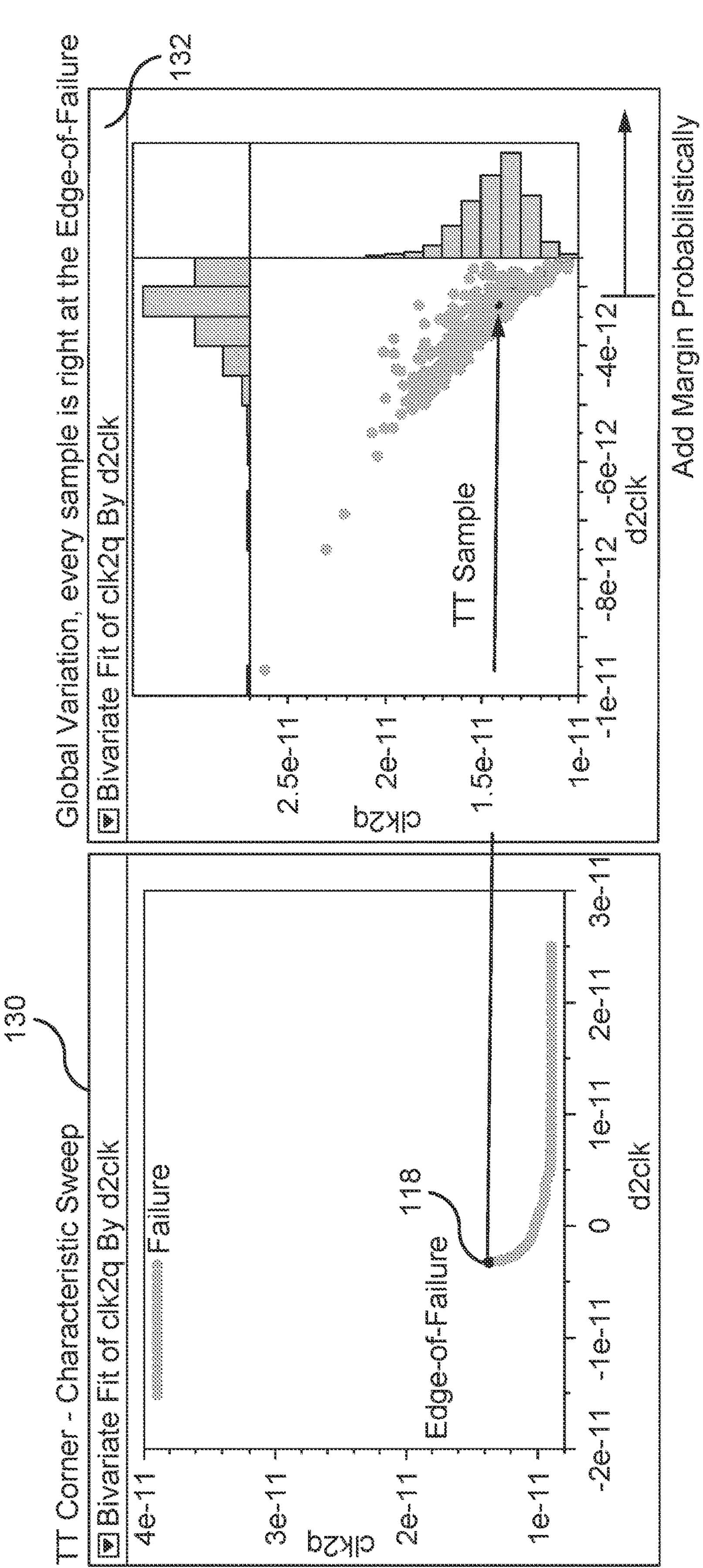
FIG. 1B illustrates an example of determining and using an edge-of-failure value in the system of FIG. 1A.

FIG. 1B illustrates an example of determining and using an edge-of-failure value 118 in the system 100 of FIG. 1A. FIG. 1B shows two charts 130 and 132. The first chart 130 plots samples of an amount of time it takes for the output signal of a register or flip flop to stabilize after a clock edge (clk2q) on the y-axis and an amount of time that an input signal arrives at the register or flip flop before the clock edge (d2clk) on the x-axis. As seen in the chart 130, when the input signal arrives too late (e.g., about 4 picoseconds after the clock edge), the register or flip flop may fail to produce the correct output on that clock cycle. The system 100 may determine the edge-of-failure value 118 as the smallest d2clk value that still allows the register or flip flop to produce the correct output value within the clock cycle. Additionally, as seen in the chart 130, the edge-of-failure value 118 is one sample at a typical-typical (TT) corner. The TT corner may indicate the process target for the superconducting electronic circuit design (e.g., Josephson junctions, inductors, or molybdenum shut and bias resistors at a critical temperature). The chart 132 shows that the edge-of-failure value 118 may be one of many samples that form the edge-of-failure. As discussed later, the system 100 may use the distribution of the edge-of-failure values to add margin probabilistically to the timing in the superconducting electronic circuit design 114 to margin away from failure.

Returning to FIG. 1A, the timing device 108 may generate a timing library 126 for the superconducting electronic circuit design 114 using the timing values 124. For example, the timing library 126 may include the timing values 124, the edge-of-failure value 118 for the timing parameter, and the corresponding process variations 122. The timing device 108 or another device in the system 100 may use the timing library 126 to perform timing analysis (e.g., static timing analysis) on the superconducting electronic circuit design 114. In this manner, the timing device 108 generates timing libraries 126 for the superconducting electronic circuit design 114 and allows timing analysis to be performed on the superconducting electronic circuit design 114.

Figure 2:
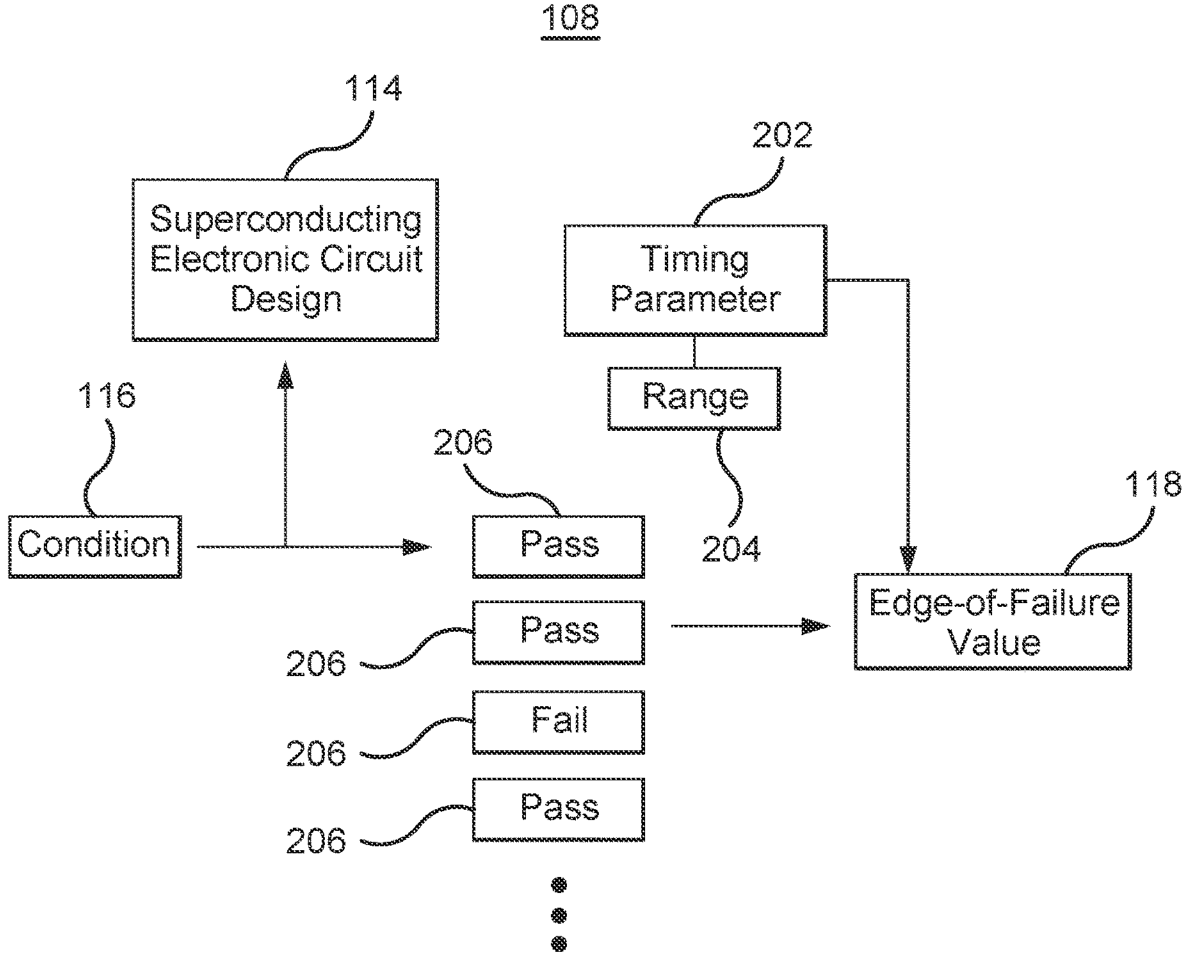
FIG. 2 illustrates an example timing device in the system of FIG. 1A determining an edge-of-failure value.

FIG. 2 illustrates an example timing device 108 in the system 100 of FIG. 1A. Generally, FIG. 2 shows the timing device 108 determining an edge-of-failure value 118 for a timing parameter.

The timing device 108 begins by receiving a superconducting electronic circuit design 114. The superconducting electronic circuit design 114 may include a superconducting electronic circuit or a superconducting electronic circuit component. The superconducting electronic circuit or the superconducting electronic circuit component may include a superconducting material (e.g., niobium) that allows the superconducting electronic circuit or superconducting electronic circuit component to conduct electricity with a resistance of zero and expel magnetic fields when cooled to temperatures below a critical temperature (Tc). For example, the superconducting electronic circuit design 114 may include Josephson junctions, AQFP logic, RSFQ logic, ERSFQ logic, or RQL. In some embodiments, the superconducting electronic circuit design 114 is part of a quantum device or a quantum computer.

The timing device 108 may also receive a condition 116 that indicates whether the superconducting electronic circuit design 114 passes or fails logic verification. If the condition 116 is met, then the timing device 108 determines that the superconducting electronic circuit design 114 passes logic verification. If the condition 116 is not met, then the timing device 108 determines that the superconducting electronic circuit design 114 fails logic verification. The condition 116 may include any suitable information. For example, the condition 116 may include a set of inputs and a set of expected outputs or expected intermediate signal values. When those inputs are provided to the superconducting electronic circuit design 114, if the superconducting electronic circuit design 114 produces the expected outputs or the expected intermediate signal values, then the superconducting electronic circuit design 114 is determined to pass logic verification. Otherwise, the superconducting electronic circuit design 114 is determined to fail logic verification.

The timing device 108 may receive a timing parameter 202. The timing parameter 202 may indicate any aspect of timing within the superconducting electronic circuit design 114. For example, the timing parameter 202 may be an arrival time of a signal in the superconducting electronic circuit design 114 or a timing separation between two signals in the superconducting electronic circuit design 114. The timing device 108 may receive or establish a range 204 for the values of the timing parameter 202. The timing device 108 may sweep this range 204 for the timing parameter 202 while simulating the superconducting electronic circuit design 114 to determine whether the superconducting electronic circuit design 114 meets the condition 116. For example, the timing device 108 may simulate the superconducting electronic circuit design 114 using different values of the timing parameter 202 within the range 204 to see if the superconducting electronic circuit design 114 meets the condition 116. In the example of FIG. 2, the timing device 108 determines the results 206 of logic verification using different values of the timing parameter 202 within the range 204. The results 206 indicate that the superconducting electronic circuit design 114 passes logic verification using three different values for the timing parameter 202 and that the superconducting electronic circuit design 114 fails logic verification under another value for the timing parameter 202.

The timing device 108 analyzes the results 206 and the values of the timing parameter 202 to determine the edge-of-failure value 118 for the timing parameter 202. Generally, the edge-of-failure value 118 may be within the range 204. Additionally, the edge-of-failure value 118 may be a value of the timing parameter 202 under which the superconducting electronic circuit design 114 passes logic verification, but where a small or slight adjustment to the edge-of-failure value 118 causes the superconducting electronic circuit design 114 to fail logic verification. Thus, the edge-of-failure value 118 for the timing parameter 202 is on the boundary or the border between which the superconducting electronic circuit design 114 passes or fails logic verification. In some embodiments, the timing device 108 includes or implements an optimizer that uses the bi-section method to solve for the edge-of-failure value 118. The optimizer may test the halfway point in the range 204 as the potential edge-of-failure value 118 and then reduce the range 204 by half depending on the results of the test. This process may continue until the optimizer locates the edge-of-failure value 118. The timing device 108 may then use the edge-of-failure value 118 during subsequent simulations of the superconducting electronic circuit design 114.

Figure 3:
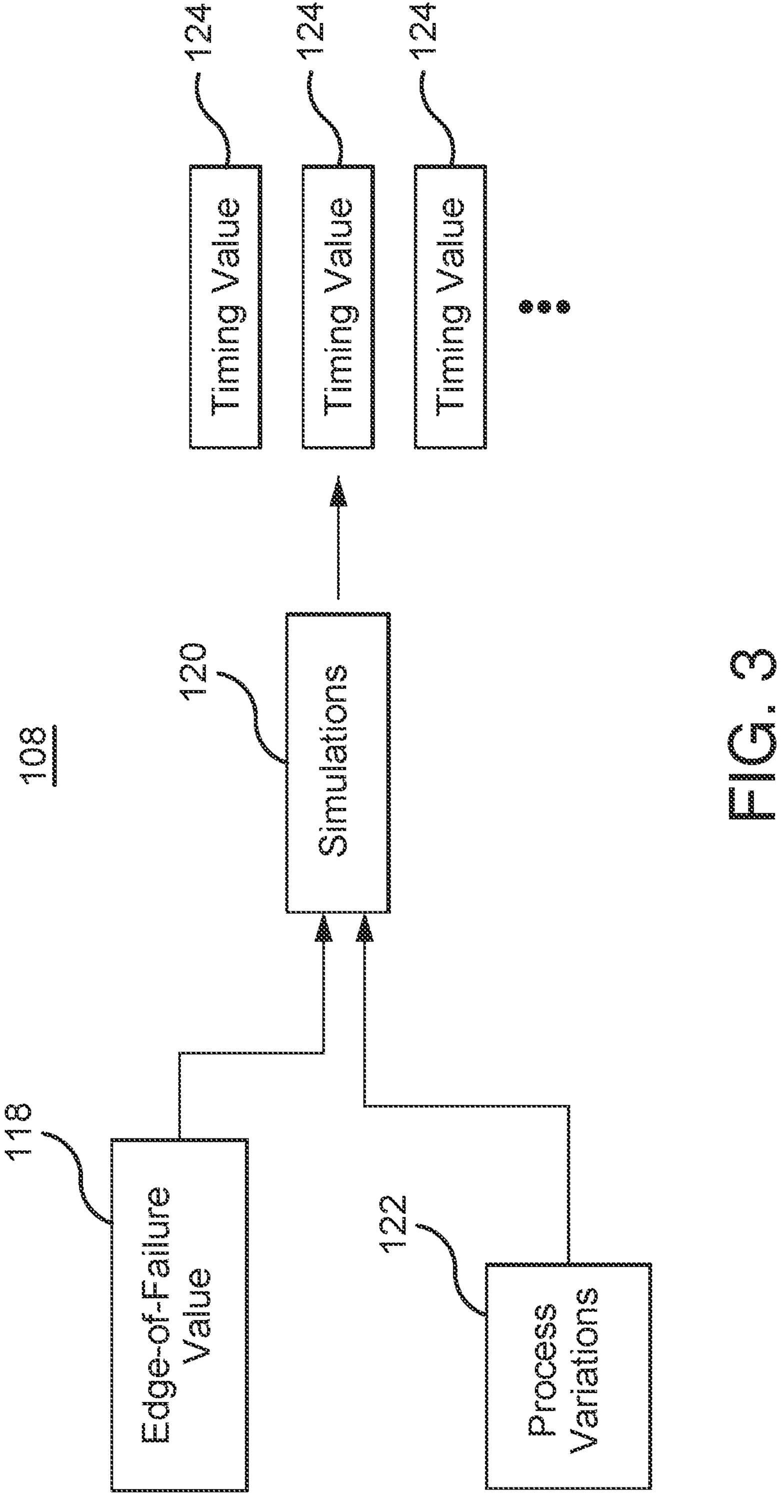
FIG. 3 illustrates an example timing device in the system of FIG. 1A determining timing values.

FIG. 3 illustrates an example timing device 108 in the system 100 of FIG. 1A. Generally, FIG. 3 shows the timing device 108 determining timing values 124. The timing device 108 simulates the superconducting electronic circuit design 114 using the edge-of-failure value 118 and different process variations 122 to produce the timing values 124. For example, the timing device 108 may simulate the superconducting electronic circuit design 114 using the edge-of-failure value 118 and a first process variation 122 to produce one or more timing values 124. The timing device 108 may then simulate the superconducting electronic circuit design 114 using the edge-of-failure value 118 and a second process variation 122 to produce one or more timing values 124. In this manner, the timing device 108 simulates the superconducting electronic circuit design using the edge-of-failure value 118 and different process variations 122 to produce the timing values 124. The process variations 122 may affect the processes or conditions used to produce or manufacture the superconducting electronic circuit design 114. For example, the process variations 122 may affect the thicknesses of layers in the superconducting electronic circuit design 114. The simulations 120 may be part of a Monte Carlo simulation using the different process variations 122. Thus, the simulations 120 may be part of a process aware Monte Carlo simulation.

The timing values 124 may measure any suitable timing characteristic in the superconducting electronic circuit design 114. For example, the timing values 124 may be slew rates, SFQ-pulse amplitude and width, or delays within the superconducting electronic circuit design 114. The timing device 108 may measure the timing values 124 during the simulations 120. As a result, the timing values 124 may represent the different slew rates or delays that occur in the superconducting electronic circuit design 114 under the edge-of-failure value 118 and the different process variations 122. Thus, the simulations 120 reveal the effects of the different process variations 122 on the slew rates and delays in the superconducting electronic circuit design 114 at the edge-of-failure value 118. The timing device 108 may use the timing values 124 to generate a timing library for the superconducting electronic circuit design 114.

Figure 4:
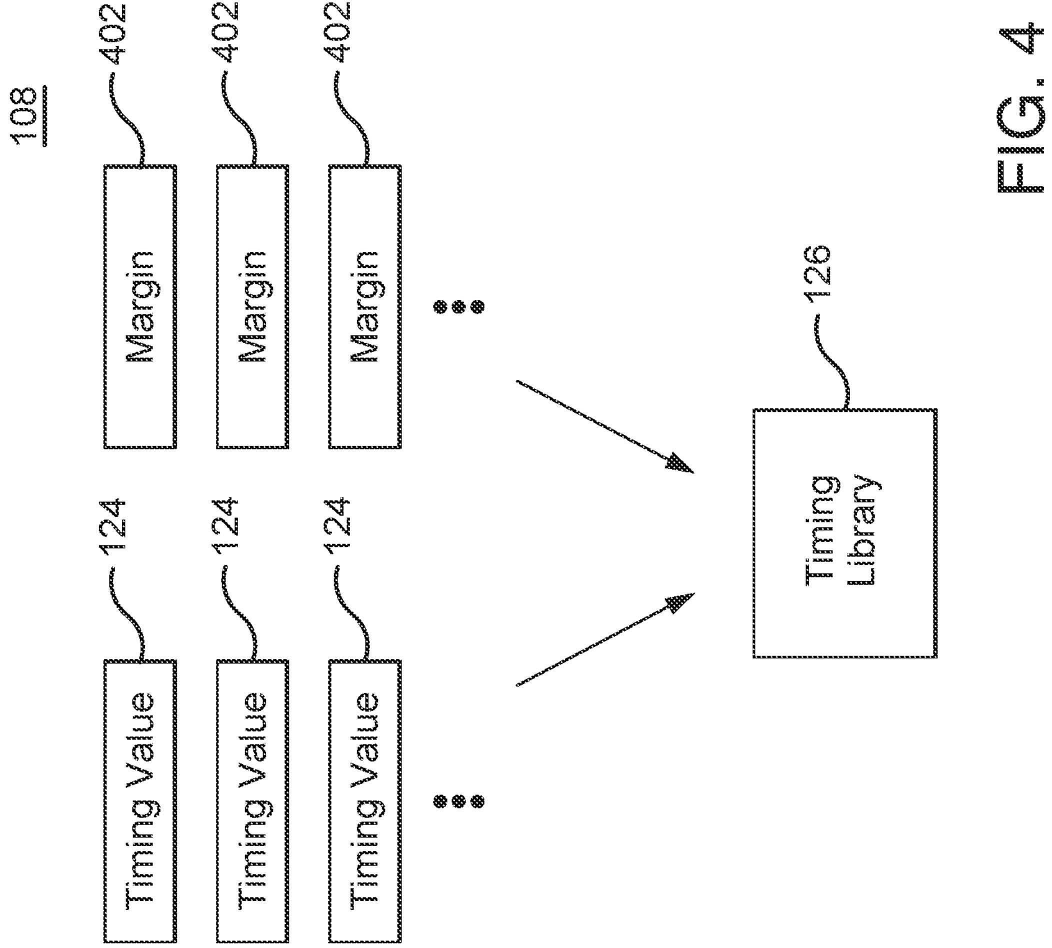
FIG. 4 illustrates an example timing device in the system of FIG. 1A generating a timing library.

FIG. 4 illustrates an example timing device 108 in the system 100 of FIG. 1A. Generally, FIG. 4 shows the timing device 108 generating a timing library 126 using the timing values 124. The timing library 126 may then be used to perform timing analysis (e.g., static timing analysis) for the superconducting electronic circuit design 114.

The timing device 108 may generate the timing library 126 using the timing values 124 and margins 402. As discussed above, the timing values 124 were produced using the edge-of-failure value 118 for the timing parameter. As a result, the timing values 124 are generated using samples at the edge-of-failure for the superconducting electronic circuit design 114. The timing device 108 may introduce the margins 402 to margin against failure. The timing device 108 may then produce the timing library 126 using the margined timing values.

The timing device 108 may determine the margins 402 statistically or probabilistically. For example, the timing device 108 may determine how much timing slack is needed to pad the timing values 124 to margin against timing violations (e.g., setup and hold or race conditions). The timing device 108 may determine an average timing value that causes the superconducting electronic circuit design 114 to fail and a distribution for the timing value. The timing device 108 may then determine the standard deviation for the timing value 124. The timing device 108 may determine the margin 402 as an amount of timing slack needed to push a particular number of standard deviations (e.g., four standard deviations away) from failure. By adding the margin 402, the timing device 108 may ensure that there is sufficient timing slack to not result in failures.

Figure 5:
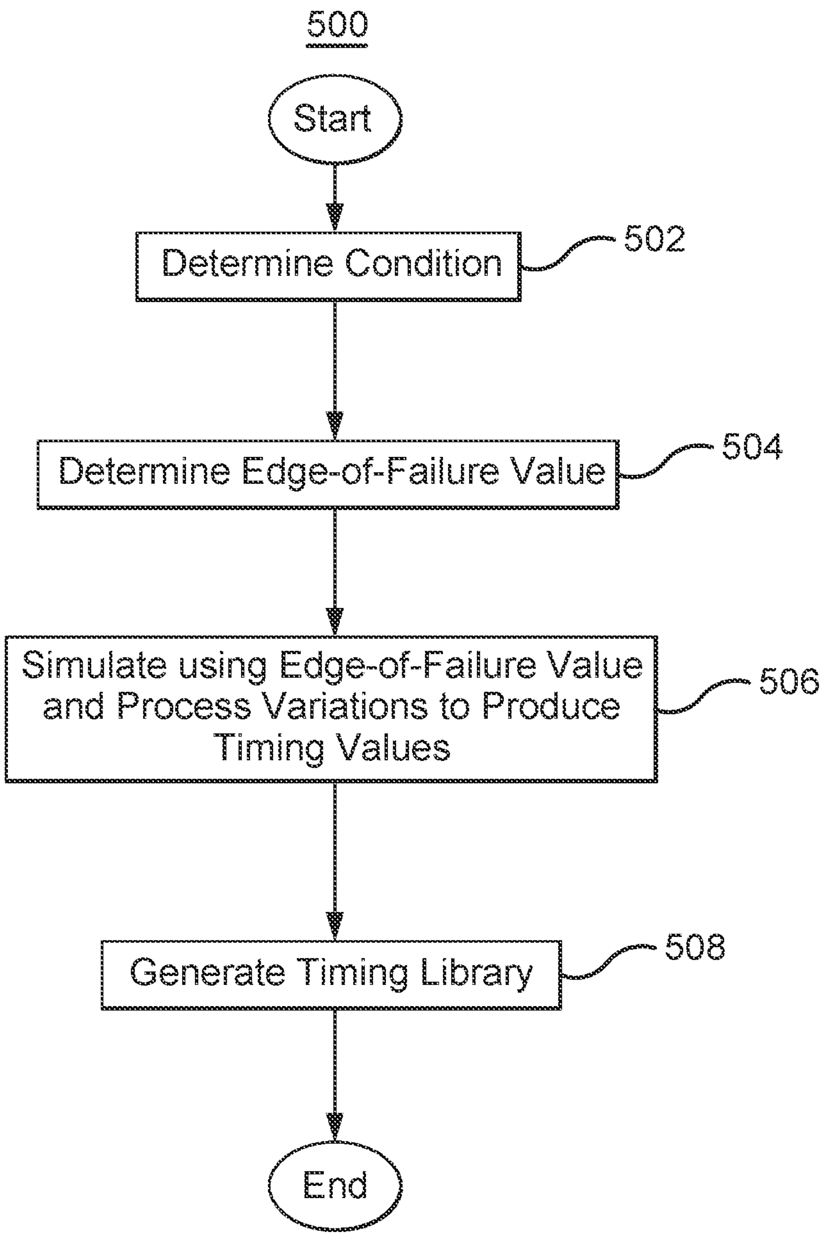
FIG. 5 is a flowchart of an example method performed in the system of FIG. 1A.

FIG. 5 is a flowchart of an example method 500 performed in the system 100 of FIG. 1A. In particular embodiments, the timing device 108 performs the method 500. By performing the method 500, the timing device 108 generates a timing library 126 for a superconducting electronic circuit design 114.

At 502, the timing device 108 determines a condition 116. The condition 116 may indicate whether the superconducting electronic circuit design 114 passes or fails logic verification. For example, the condition 116 may include a set of inputs and a set of expected outputs or expected intermediate signal values. When the inputs are provided to the superconducting electronic circuit design 114, if the superconducting electronic circuit design 114 produces the expected outputs or the expected intermediate signal values, then the superconducting electronic circuit design 114 passes logic verification. If the superconducting electronic circuit design 114 does not produce the expected outputs or the expected intermediate signal values, then the superconducting electronic circuit design 114 fails logic verification.

At 504, the timing device 108 determines an edge-of-failure value 118 for a timing parameter 202. For example, the timing device 108 may simulate the superconducting electronic circuit design 114 while sweeping a range 204 of values for the timing parameter 202 to see if the superconducting electronic circuit design 114 passes or fails logic verification. The timing device 108 may simulate the superconducting electronic circuit design 114 any suitable number of times for any suitable number of values for the timing parameter 202. The timing device 108 may analyze the values of the timing parameter 202 along with the results 206 of logic verification to determine the edge-of-failure value 118 for the timing parameter 202. The edge-of-failure value 118 may represent the value of the timing parameter 202 at which the superconducting electronic circuit design 114 is on the border or boundary between failing and passing logic verification. As a result, a slight adjustment or change to the edge-of-failure value 118 for the timing parameter 202 may cause the superconducting electronic circuit design 114 to transition from passing logic verification to failing logic verification.

At 506, the timing device 108 simulates the superconducting electronic circuit design 114 using the edge-of-failure value 118 and different process variations 122 to produce timing values 124. The timing device 108 may simulate the superconducting electronic circuit design 114 using the edge-of-failure value 118 and any suitable number of process variations 122. For example, the timing device 108 may simulate the superconducting electronic circuit design 114 using the edge-of-failure value 118, and a first process variation 122 to produce one or more timing values 124. The timing device 108 may then simulate the superconducting electronic circuit design 114 using the edge-of-failure value 118 and a second process variation 122 to produce one or more timing values 124. The timing device 108 may determine the different process variations 122 according to a Monte Carlo simulation. As a result, the simulations may be part of a process aware Monte Carlo simulation of the superconducting electronic circuit design 114.

The timing values 124 may be a measure of any timing characteristic of the superconducting electronic circuit design 114. For example, the timing values 124 may be measured slew rates or delays within the superconducting electronic circuit design 114. Because the edge-of-failure value 118 was used during the simulations, the timing values 124 may be a distribution of timing values 124 at the edge-of-failure for the superconducting electronic circuit design 114. The simulations 120 may reveal the effects of the different process variations 122 on the slew rates or delays of the superconducting electronic circuit design 114 at the edge-of-failure.

At 508, the timing device 108 generates the timing library 126 for the superconducting electronic circuit design 114 using the timing value 124. In certain embodiments, the timing device 108 may introduce a margin 402 or slack into the timing values 124 when generating the timing library 126. By introducing the slack or margin 402, the timing device 108 margins away from the average failure and may ensure adequate timing margins in the superconducting electronic circuit design 114. The timing device 108, or another device, may use the timing library 126 to perform timing analysis (e.g., static timing analysis) on the superconducting electronic circuit design 114.

Figure 6:
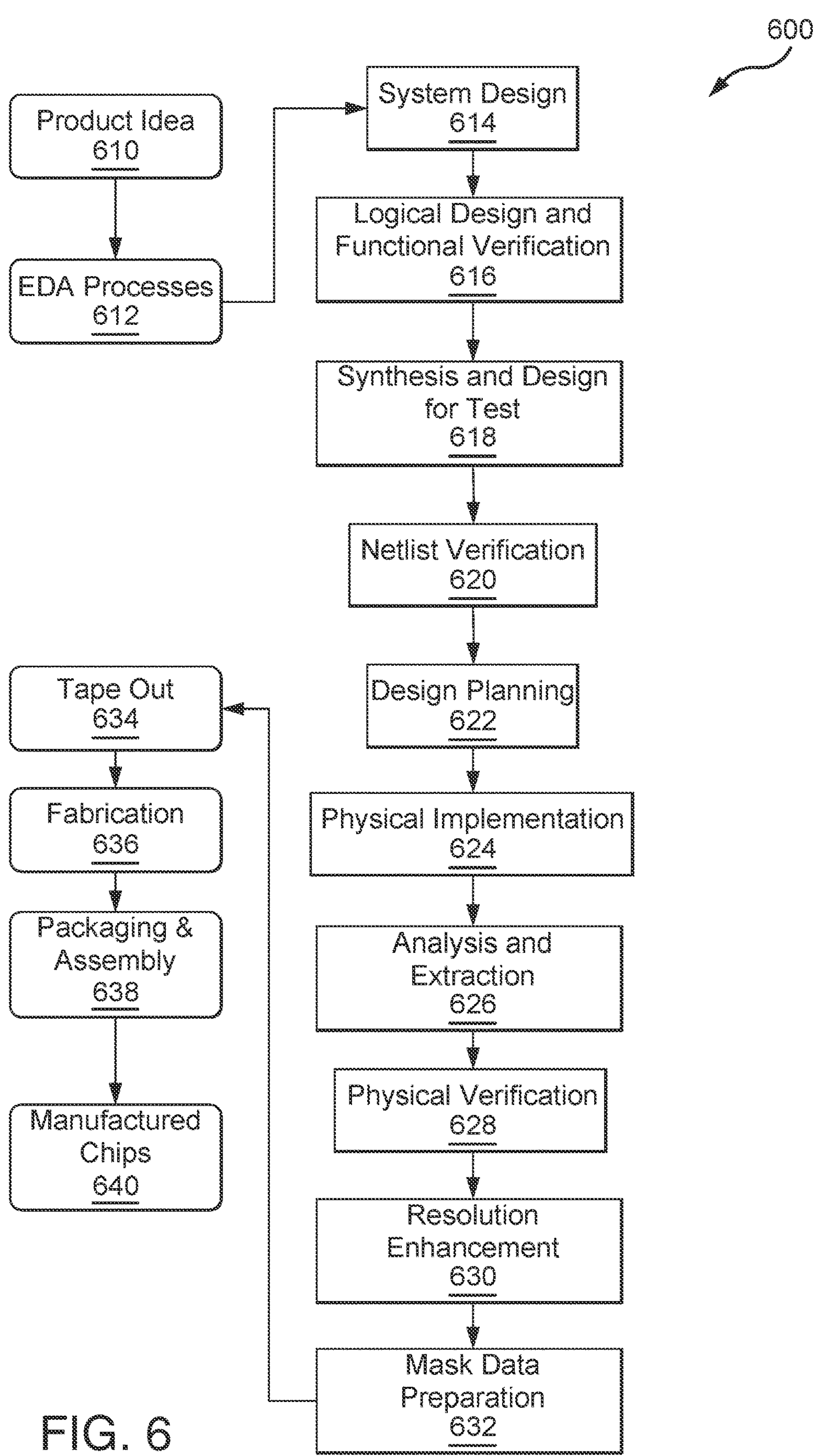
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 6. The processes described by be enabled by EDA products (or EDA systems).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. An apparatus for generating a timing library for a superconducting electronic circuit design, the apparatus comprising:

a memory; and a processor communicatively coupled to the memory, the processor configured to:

determine a condition that indicates whether a superconducting electronic circuit design passes or fails logic verification;

determine, according to the condition, an edge-of-failure value for a timing parameter for the superconducting electronic circuit design;

simulate the superconducting electronic circuit design using the edge-of-failure value for the timing parameter and a first process variation to produce a first timing value for the superconducting electronic circuit design;

simulate the superconducting electronic circuit design using the edge-of-failure value for the timing parameter and a second process variation to produce a second timing value for the superconducting electronic circuit design; and generate a timing library for the superconducting electronic circuit design based at least in part on the first timing value and the second timing value.

2. The apparatus of claim 1, wherein the processor is further configured to perform static timing analysis for the superconducting electronic circuit design using the timing library.

3. The apparatus of claim 1, wherein the timing parameter is a signal arrival time in the superconducting electronic circuit design or a timing separation between a race condition in the superconducting electronic circuit design.

4. The apparatus of claim 1, wherein determining the edge-of-failure value comprises determining, for different values of the timing parameter, whether the superconducting electronic circuit design meets the condition.

5. The apparatus of claim 1, wherein simulating the superconducting electronic circuit design to produce the first timing value and the second timing value is part of a Monte Carlo simulation of the superconducting electronic circuit design.

6. The apparatus of claim 1, wherein the processor is further configured to set a range for the timing parameter, wherein determining the edge-of-failure value for the timing parameter comprises sweeping within the range.

7. The apparatus of claim 1, wherein the processor is further configured to add a margin to the first timing value and the second timing value.

8. A method for generating a timing library for a superconducting electronic circuit design, the method comprising:

determining a condition that indicates whether a superconducting electronic circuit design passes or fails logic verification;

determining, according to the condition and by a processor, an edge-of-failure value for a timing parameter for the superconducting electronic circuit design;

simulating, by the processor, the superconducting electronic circuit design using the edge-of-failure value for the timing parameter and a first process variation to produce a first timing value for the superconducting electronic circuit design;

simulating, by the processor, the superconducting electronic circuit design using the edge-of-failure value for the timing parameter and a second process variation to produce a second timing value for the superconducting electronic circuit design; and generating a timing library for the superconducting electronic circuit design based at least in part on the first timing value and the second timing value.

9. The method of claim 8, further comprising performing static timing analysis for the superconducting electronic circuit design using the timing library.

10. The method of claim 8, wherein the timing parameter is a signal arrival time in the superconducting electronic circuit design or a timing separation between a race condition in the superconducting electronic circuit design.

11. The method of claim 8, wherein determining the edge-of-failure value comprises determining, for different values of the timing parameter, whether the superconducting electronic circuit design meets the condition.

12. The method of claim 8, wherein simulating the superconducting electronic circuit design to produce the first timing value and the second timing value is part of a Monte Carlo simulation of the superconducting electronic circuit design.

13. The method of claim 8, further comprising setting a range for the timing parameter, wherein determining the edge-of-failure value for the timing parameter comprises sweeping within the range.

14. The method of claim 8, further comprising adding a margin to the first timing value and the second timing value.

15. A non-transitory computer readable medium storing instructions for generating a timing library for a superconducting electronic circuit design, wherein when the instructions are executed by a processor, the processor:

determines, based on a condition indicating whether a superconducting electronic circuit design passes or fails logic verification, an edge-of-failure value for a timing parameter for the superconducting electronic circuit design;

simulates the superconducting electronic circuit design using the edge-of-failure value for the timing parameter and a plurality of process variations to produce a plurality of timing values for the superconducting electronic circuit design; and generates a timing library for the superconducting electronic circuit design based on the plurality of timing values.

16. The medium of claim 15, wherein the processor further performs static timing analysis for the superconducting electronic circuit design using the timing library.

17. The medium of claim 15, wherein the timing parameter is a signal arrival time in the superconducting electronic circuit design or a timing separation between a race condition in the superconducting electronic circuit design.

18. The medium of claim 15, wherein determining the edge-of-failure value comprises determining, for different values of the timing parameter, whether the superconducting electronic circuit design meets the condition that indicates whether the superconducting electronic circuit design passes or fails logic verification.

19. The medium of claim 15, wherein simulating the superconducting electronic circuit design to produce the plurality of timing values is part of a Monte Carlo simulation of the superconducting electronic circuit design.

20. The medium of claim 15, wherein the processor further sets a range for the timing parameter, wherein determining the edge-of-failure value for the timing parameter comprises sweeping within the range.

* * * * *